(12) United States Patent
Pallett

(10) Patent No.: US 6,745,706 B2
(45) Date of Patent: Jun. 8, 2004

(54) PROCESS AND APPARATUS FOR DISPOSING OF MUNICIPAL SOLID WASTE

(76) Inventor: Richard B. Pallett, 169 Conneaught Crescent, Bolton, Ontario (CA), L7E 2S8

(*) Notice: Subject to any disclaimer, the term of this patent is extended or adjusted under 35 U.S.C. 154(b) by 0 days.

(21) Appl. No.: 10/279,248

(22) Filed: Oct. 24, 2002

(65) Prior Publication Data

US 2003/0075086 A1 Apr. 24, 2003

Related U.S. Application Data

(60) Provisional application No. 60/336,372, filed on Oct. 24, 2001.

(51) Int. Cl.[7] .............................. F23B 7/00; F23G 5/02; F23N 5/18
(52) U.S. Cl. ...................... 110/342; 110/324; 110/346; 110/186; 110/222; 110/220; 110/224; 110/233
(58) Field of Search .................... 110/218, 219, 110/220, 221, 222, 224, 233, 346, 347, 342, 234

(56) References Cited

U.S. PATENT DOCUMENTS

| | | | | | |
|---|---|---|---|---|---|
| 3,159,353 A | * | 12/1964 | Atwater | ..................... | 241/39 |
| 3,626,875 A | * | 12/1971 | Cleaves et al. | ............. | 110/210 |
| 4,143,603 A | * | 3/1979 | Martin et al. | ............... | 110/222 |
| 4,232,614 A | * | 11/1980 | Fitch et al. | ................. | 110/235 |
| 4,882,903 A | * | 11/1989 | Lowry et al. | ............. | 60/39.182 |
| 4,932,336 A | * | 6/1990 | Srowig et al. | .............. | 110/346 |
| 4,977,839 A | * | 12/1990 | Fochtman et al. | .......... | 110/346 |
| 5,516,975 A | * | 5/1996 | Takazawa | ................... | 588/256 |
| 5,623,822 A | * | 4/1997 | Schuetzenduebel et al. | ....................... | 60/39.182 |
| 5,847,353 A | * | 12/1998 | Titus et al. | ............. | 219/121.36 |

FOREIGN PATENT DOCUMENTS

| | | | | |
|---|---|---|---|---|
| DE | 19731010 A1 | * | 1/1999 | ........... C10B/53/00 |

* cited by examiner

Primary Examiner—K. B. Rinehart
(74) Attorney, Agent, or Firm—David A. Greenlee

(57) ABSTRACT

A system for disposing of municipal solid waste 10) provides commercially-available equipment that is modified to initially remove identifiable unwanted components from the waste (12), and then chop the waste into small pieces (16) of a size suitable for handling and combustion. The moisture content of the waste is reduced in a closed system (20) by passing dry air through the waste in a confined space (30) to absorb moisture and produce moist air, which is then dehumidified via refrigeration equipment (34). The dehumidified air is recycled (30, 40) through the waste repeatedly through the closed system (20) until the water content has reached the predetermined amount. The waste is stored in a bunker (41) for later burning, or is immediately burned in a furnace (24) to produce heat that is used to produce steam (50), which drives a generator (26) to produce electricity (52) that is partly used to power the process and partly sold commercially.

15 Claims, 4 Drawing Sheets

PROCESS AND APPARATUS FOR DISPOSING OF MUNICIPAL SOLID WASTE

This application claims the benefit of Provisional Application No. 60/336,372, filed Oct. 24, 2001.

TECHNICAL FIELD

This invention relates to the disposal of municipal solid waste and, more particularly, to a pollution-free process and apparatus for disposing of municipal solid waste and generating electricity.

BACKGROUND OF THE INVENTION

The disposal of municipal solid waste (MSW) presents an increasingly significant and difficult problem for municipalities to solve. As space for landfills diminishes and the cost of such waste disposal has become prohibitive, many schemes have been devised to burn the waste and generate electricity.

The composition of MSW can vary from locale to locale, but, on the average, has been found typically to be about 50% of combustible materials, such as wood, paper, plastic, food, yard waste and textiles, 5% metals, 10% glass, dirt and stones, and 35% water. The water content varies between 40% and 60% of the waste. To burn efficiently, the non-combustible content should be removed, along with the majority of the water. Sorting and magnetic separation can remove a majority of the unwanted components, but it is necessary to reduce the water content to 10% or below.

Many schemes have been devised to dewater the MSW, including heating, centrifugal separation, compression. However, these schemes have proved to be extremely costly since they require a significant amount of fuel just to heat the waste to dewater it sufficiently to become burnable. In addition, the heating of the wet waste produces a significant amount of airborne contaminants or pollutants. Scrubbers and other costly equipment are necessary to reduce the level of pollution to tolerable amounts. As a result of these shortcomings, hundreds of so-called "trash-burning power plants" have become economically untenable and hundreds more are run at a significant loss.

More recently a process has been introduced which utilizes composting and aerobic techniques to dry the MSW, using closely controlled humidity and temperature. However, this process is so slow that several days are required to reduce the water content sufficiently to produce a burnable biomass.

There is a need for a process and apparatus for disposing of MSW that is cost-efficient and non-polluting.

SUMMARY OF THE INVENTION

It is therefore an object of this invention to a process and apparatus for disposing of MSW that is cost-efficient and non-polluting.

In one aspect, this invention features apparatus and a process for reducing the moisture content of MSW by continuously passing warm dry air through the waste in a closed chamber without appreciably heating the waste.

In another aspect, this invention features a method of processing municipal solid waste, comprising the steps of: removing identifiable unwanted components from the waste, chopping the waste into small pieces of a size suitable for handling and combustion, reducing the moisture content of the waste to a predetermined amount in a closed system by passing dry air through the waste in a confined space to absorb moisture and produce moist air, dehumidifying the moist air via a refrigeration cycle and recycling the dehumidified air through the waste repeatedly in a closed system until the water content has reached the predetermined amount, combusting the waste to produce heat, producing steam from the heat, and using the steam to produce electricity, thereby eliminating any transfer of contaminants from the waste to the atmosphere during dewatering of the waste.

Preferably, MSW moisture content is reduced to 10% or less, and the steam is used initially to generate electricity, and thereafter is used to preheat the dehumidifying air to enhance its ability to absorb moisture.

In a further aspect, this invention features a system for disposing of municipal solid waste, comprising means for removing unwanted content from the waste, means for chopping the waste into pieces small enough for handling and combustion, a closed drying chamber for reducing the moisture content of the waste, including means for injecting dry air through the chamber to absorb moisture from the waste and producing dewatered waste, means for removing moist air from the drying chamber, refrigeration cycle means for dehumidifying the air and recycling the dehumidified air back through the chamber in a dosed system, a combustion chamber for combusting the dewatered waste to produce heat, a heat exchanger for using the heat to produce steam, and a steam-powered electric generator for utilizing the steam to produce electricity, whereby no contaminants are transferred to the atmosphere during the dewatering of the waste.

Another feature of this invention is provision of a second heat exchanger for transferring heat from the steam exiting the generator to the dry air before it enters the drying chamber.

These and other objects and features of this invention will become more readily apparent upon reference to the following detailed description of a preferred embodiment, as illustrated in the accompanying drawings, in which:

DESCRIPTION OF THE PREFERRED EMBODIMENT

Figure 1:
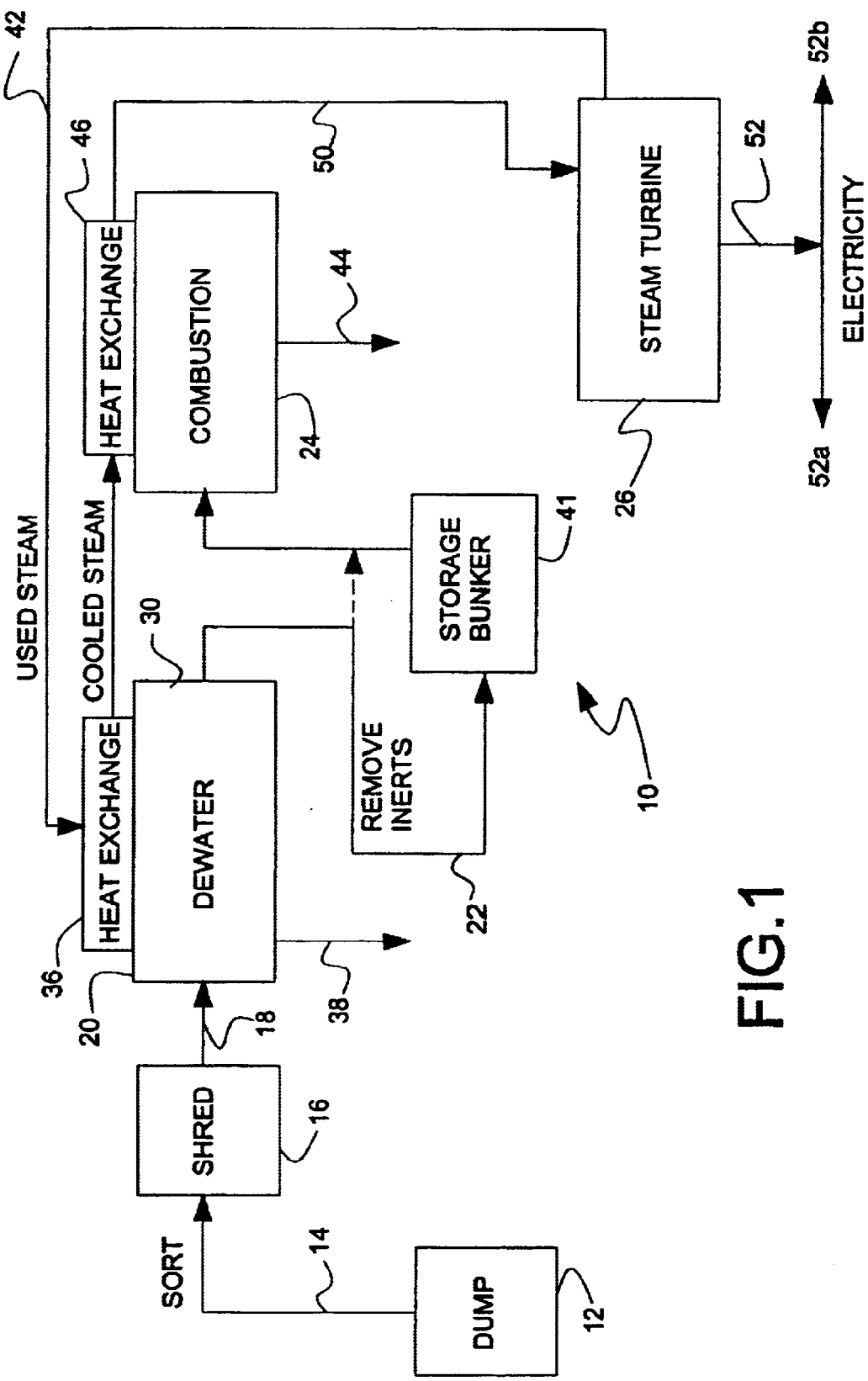
FIG. 1 is a simplified schematic depiction of one embodiment the MSW disposal process and system of this invention.
Figure 2:
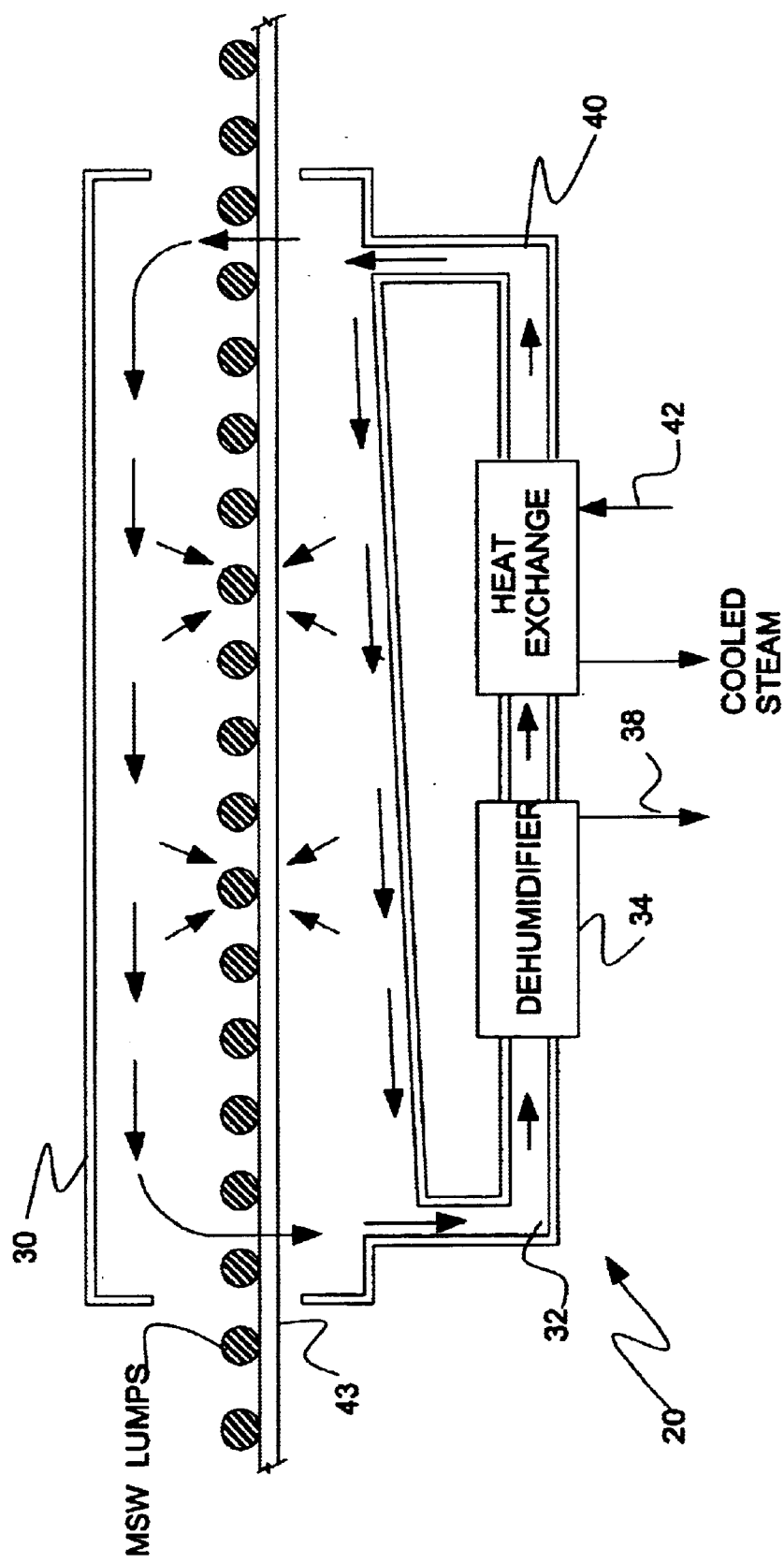
FIG. 2 is a schematic drawing of a commercially-available drying/dewatering system that can be adapted for use in the system of this invention.

As illustrated in FIG. 1, the MSW disposal system 10 of this invention comprises a dumping and sorting platform 12, a conveyor 14 connecting to a shredder or chopper 16, a conveyor 18 connecting to a dewatering chamber 20, a conveyor 22 connecting to a combustion chamber 24, and a steam-powered electric generator 26. In operation, MSW is dumped onto sorting platform 12 and placed on a conveyor 14, where large, readily removable unwanted content is removed. The residue is then conveyed to chopper 16, where it is chopped into small pieces. Conveyors suitable for adaptation for use in this process are made by Machinex Recycling Conveyors, Pickering, Ontario, Canada. A portable version of shredding equipment suitable for adaptation for use in this system is made by SHRED-TECH, Cambridge, Ontario, Canada. The chopped MSW is conveyed by conveyor 18 into the closed dewatering chamber 20, where warm, dry air is passed through the MSW, picks up moisture, then exits in a closed system (no exposure to atmospheric air) to a refrigeration system that cools the air below the dew point to dehumidify the air. A commercially-available dewatering system that can be adapted for use in this system is Illustrated in FIG. 3, and is made by HYGREX-Spehr Industries, Bolton, Ontario, Canada.

Figure 3:
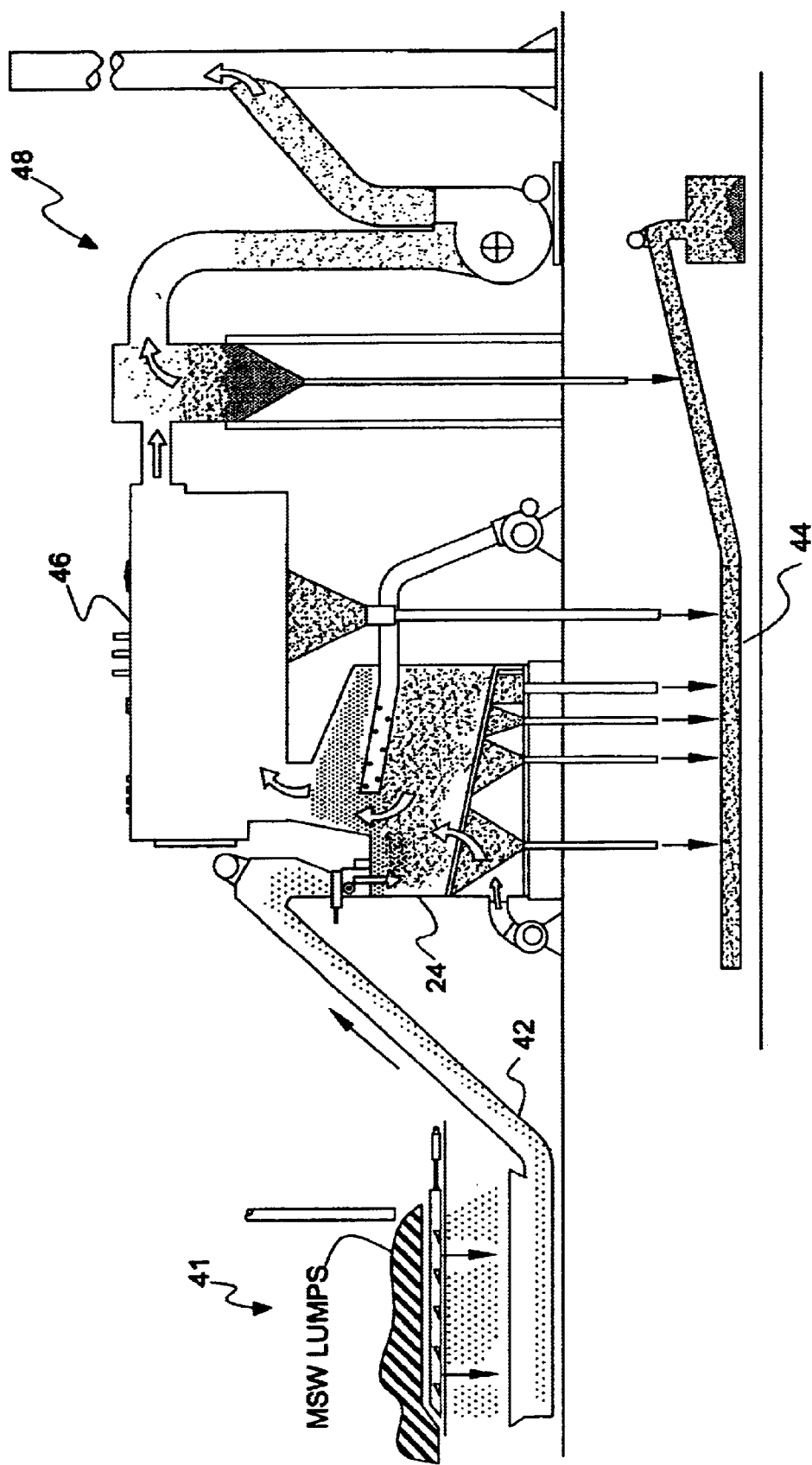
FIG. 3 is a schematic drawing of a commercially-available combustion system that can be adapted for use in the MSW disposal system of this invention.

In FIG. 3, the MSW enters a closed chamber 30 where warm dry air is circulated to pick up moisture to dehumidify the waste. Moist air exits system that can be adapted for use in this system is Illustrated in FIG. 3, and is made by HYGREX-Spehr Industries, Bolton, Ontario, Canada.

In FIG. 3, the MSW enters a closed chamber 30 where warm dry air is circulated to pick up moisture to dehumidify the waste. Moist air exits through duct 32 and enters a refrigeration/dehumidification unit 34, which drops the dew point and condenses the moisture, which is drained through pipe 38. The now-dry air exits unit 34 and returns to chamber 30 via duct 40 to further dehumidify the MSW. As shown in FIG. 1, a heat exchanger 36 is used to warm or preheat the dry air in duct 40 before it enters unit 34, thereby enhancing its ability to absorb moisture. Heat exchanger 36 is supplied with steam via pipe 42, as will be later described. The MSW traverses chamber 30 on a conveyor 43, the speed of which determined by the time needed for the MSW to reach a predetermined, desired moisture content (e.g. 10%).

The dewatered MSW is then sorted to remove the metal, glass and rocks on conveyor 22 which transports it to a bunker 41 for storage for future use, or is immediately conveyed (dotted lines, FIG. 1) into a combustion chamber 24 (as shown), where it is burned efficiently in a self-sustaining, continuous burn. Equipment for burning biomass, which can be adapted to burn the dewatered MSW in this system, is illustrated in FIG. 3, and is made by KMW, London, Ontario, Canada.

In FIG. 3, combustion chamber 24 is supplied with fuel by an automatic system 42 from bunker 41 or directly from conveyor 22. Ash resulting from combustion drops down and is handled by an automatic system 44. The heat of combustion is used to produce steam in a boiler 46, while exhaust gasses resulting from combustion are disposed of by a fluegas system with any commercially-available emission control apparatus 48.

As seen in FIG. 1, this apparatus is adapted so that steam exiting the boiler/heat exchanger 46 is sent via pipe 50 to a steam-powered electric turbine 26 to produce electric power in a power line 52 in a known manner. A portion of the electricity 52a is partially used to power the process, with the remainder 52b sold commercially and sent to the grid. A steam turbine suitable for adaptation to this system is made by TurboSteam, Turners Falls, Mass. After driving turbine 26, the used steam exits and is sent via pipe 42 to heat exchanger 36 to preheat the dried air in duct 36, as described above.

The ash resulting from combustion of the dewatered MSW is now suitable for use as clean landfill. The process of dewatering the MSW by using a closed dehumidification system prevents any transfer of pollutants to the atmosphere during dewatering.

As described above, the equipment used in this system and process are modifications of the commercially-available equipment described above and shown in the accompanying drawings.

Figure 4:
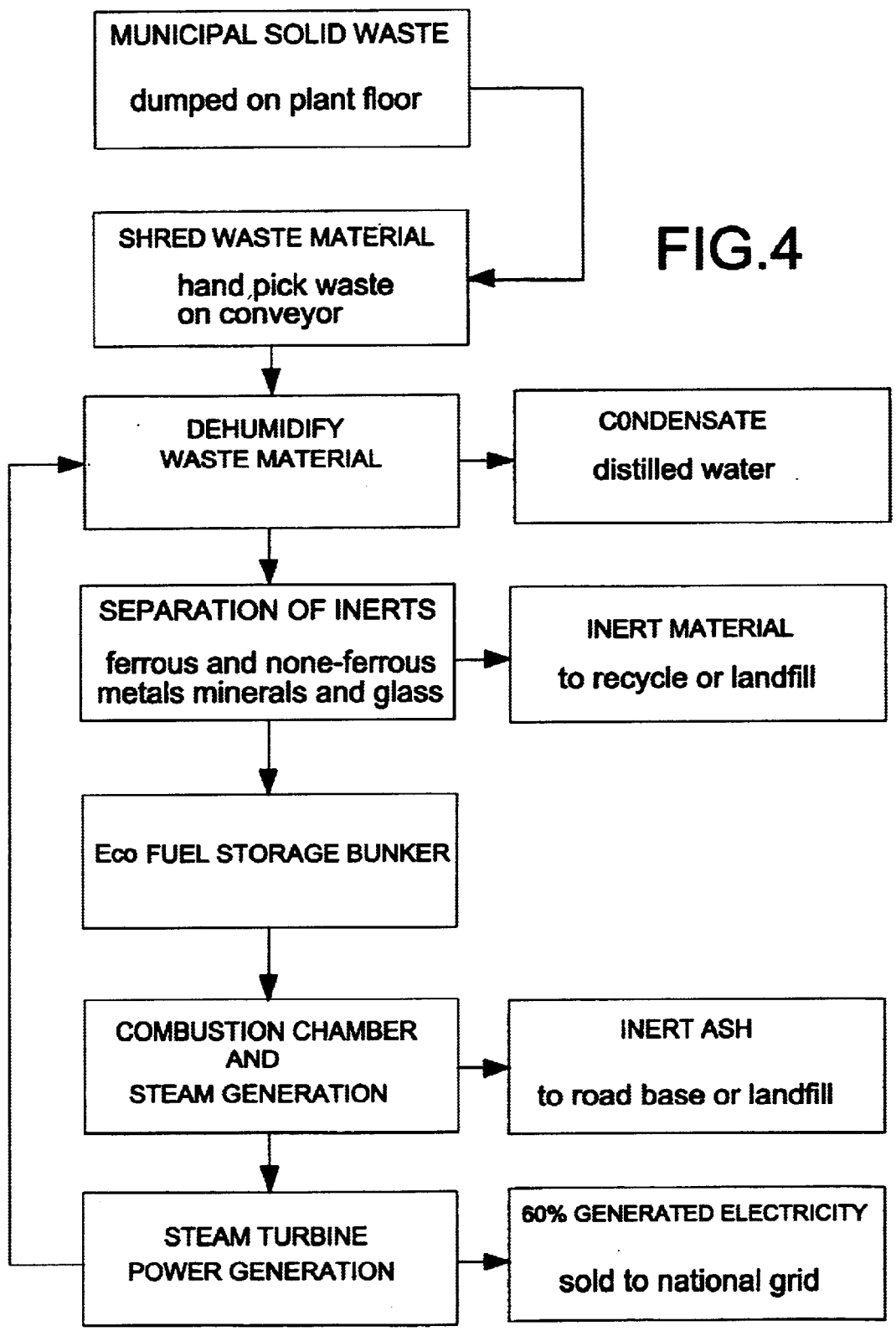
FIG. 4 is a process flow chart depicting the preferred embodiment of the process of this invention in greater detail.

FIG. 4 presents flow diagram of a specific preferred embodiment (in more detailed form than described above) of this process, as integrated into a single facility or plant, and can be segregated into the following discrete process segments:

Receiving and Storage

MSW is delivered by truck and/or rail and dumped onto the plant floor. It is then picked up by a front-loading truck and dumped into a hopper for distribution on a conveyor. Workers flank the conveyor to hand-pick, sort out and remove undesired materials which might damage the downstream shredding equipment.

Shredding

The conveyor then feeds the shredder, which chops or shreds the MSW into pieces having a maximum lump size of 2" (50 mm). A conveyor then feeds the shredded MSW to the dewatering, or dehumidifying, station.

Dewatering

Here the shredded MSW is conveyed slowly through the drying chamber where it is dehumidified for a period of time needed to dry the shredded MSW to a predetermined moisture content; here, in this example process, it is 5 hours. The refrigeration/dehumidification process produces condensed water that is sent to a water treatment plant for processing. When it exits the drying chamber, the MSW preferably has approximately a 10% or lower moisture content. Preferably, the MSW lumps will be tumbled or otherwise agitated to expose all surfaces to the warm moist air.

Separation of Inerts

The dried MSW exits the drying chamber on a conveyor and undergoes a process of separating out such inerts (inert material) as metals, minerals and glass, using established and proven separation technology. This inert material is then recycled or sent to a landfill. At this point in the process, the MSW has attained a 50% weight reduction, and has a calorific value of 15–18 MJ/kg. It is then sent to a fuel storage bunker to await removal for feeding the combustion process.

Combustion and Power Generation

When needed, this processed and dewatered MSW is fed to the combustion chamber at a controlled rate by any of several conventional means, where it is combusted to produce steam, for use in a steam turbine to generate electricity. The inert ash (2%), which results from this combustion, can be used for landfill or as a road base. In this exemplary embodiment, some of the generated electricity (25%–40%) is used in the processing of the MSW, and the majority (60%–75%) is sold commercially.

Thus, this invention features a system comprising a system (apparatus) and a process for reducing the moisture content of MSW by continuously passing warm dry air through the waste in a closed chamber without appreciably heating the waste (only minimal heating of the MSW will occur by the preheated inlet air). Since moisture is removed by evaporation (i.e. absorbed by the dry warm air) and not by boiling, there is no need to heat the MSW to boil off the water, as in conventional "trash-burning power plants", resulting in a significant energy savings. This low process temperature, plus conducting the drying in a closed chamber, eliminate or drastically reduce the boiling off or other escape of pollutants into the surrounding atmosphere.

This MSW disposal process and system effectively dispose of MSW, and provide numerous advances over the present state of the art; they: (1) enable economic electric power generation, (2) eliminate the need for sanitary landfills, (3) eliminate atmospheric pollution during dewatering, (4) reduce energy requirements to dewater the MSW, and (5) provide an economic benefit through the efficient use of generated steam to (a) preheat the drying air to speed the dewatering process, (b) provide electricity to power the process, and (c) supply electricity for sale.

While only preferred embodiments have been described and shown, obvious modifications are contemplated within the scope of this invention, as defined in the following claims.

I claim:

1. A method of processing municipal solid waste to maximize recovery of recyclable and inert waste components and to condition the remainder as fuel for combustion to produce energy, comprising the steps of;
    a. chopping the waste into small pieces of a size suitable for handling and combustion,
    b. conveying the chopped waste to a closed drying chamber,
    c. conveying the chopped waste through the closed drying chamber at a predetermined rate of travel,
    d. reducing the moisture content of the waste in the closed drying chamber to a predetermined amount in a closed air circulation system by passing warm dry sir through the waste in a confined space to absorb moisture and produce moist air, dehumidifying the moist air via a refrigeration cycle, recycling the dehumidified air through the waste repeatedly in the closed system to produce dried waste without appreciably raising the temperature of the waste, and choosing the predetermined rate of travel so that the moisture content of the chopped waste has reached the predetermined amount when it exits the closed drying chamber as dried waste,
    e. removing the recyclable and inert components from the dried waste to produce combustible dried waste,
    f. combusting the combustible dried waste to produce heat and
    g. producing steam from the heat.

2. The method of claim 1, wherein the calorific value of the produced combustible dried waste is approximately 15–18 MJ/kg.

3. The method of claim 1, including the step of agitating the small pieces of chopped waste in the closed drying chamber to enhance exposure to dry air to speed the reduction of moisture content.

4. The method of claim 1, including the step of using the steam to preheat the dry air in step b. before entry into the drying chamber to enhance its ability to absorb moisture.

5. The method of claim 1, including the step of using the steam to produce electricity.

6. The method of claim 1, including the step of chopping step the waste into lumps having a maximum size of about 2 inches (50 mm).

7. The method of claim 1, including the further step of removing identifiable unwanted components from the waste prior to step a.

8. The method of claim 1, wherein the method is continuous from step a. through step e., and including the step of storing the dried waste prior to combusting the combustible dried waste in step f.

9. A system of processing municipal solid waste to maximize recovery of recyclable and inert waste components and to condition the remainder as fuel for combustion to produce energy, comprising
    means for removing unwanted content from the waste,
    means for chopping the waste into pieces small enough for handling and combustion,
    means for conveying the chopped waste to a drying chamber, said drying chamber being a closed chamber for reducing the moisture content of the waste to produce dried waste,
    a closed air circulation system, including means for injecting warm dry air through the drying chamber to absorb moisture from the waste and produce dewatered waste, means for removing moist air from the drying chamber, and refrigeration cycle means for dehumidifying the air and recycling the dehumidified air back through the chamber,
    means for conveying the waste through the drying chamber at a predetermined rate of travel so that the dried waste attains a predetermined moisture content when it exits the drying chamber,
    means for removing the recyclable and inert components from the dried waste to produce combustible dried waste,
    means for conveying the combustible dried waste to a combustion chamber for combusting the combustible dried waste to produce heat, and
    a heat exchanger for producing steam from the heat.

10. The system of claim 9, wherein the calorific value of the produced combustible dried waste is approximately 15–18 MJ/kg.

11. The system of claim 9, including a steam-powered electric generator for utilizing the steam to produce electricity.

12. The system of claim 9, including a second heat exchanger for transferring heat from the steam exiting the generator to the dry air before it enters the drying chamber.

13. The system of claim 9, including means for storing the dried waste prior to burning.

14. The system of claim 9, including means for varying the predetermined rate of travel of the waste through the drying chamber.

15. The system of any of claim 9, 10, 11, 12, 13, or 14, including means for feeding the combustible dried waste to the combustion chamber at a controlled rate.

* * * * *